United States Patent
Zhou et al.

(10) Patent No.: US 11,303,842 B2
(45) Date of Patent: Apr. 12, 2022

(54) MINI LED TELEVISION CONTROL SYSTEM AND METHOD

(71) Applicant: SHENZHEN SKYWORTH-RGB ELECTRONIC CO., LTD, Shenzhen (CN)

(72) Inventors: Jianhua Zhou, Shenzhen (CN); Xiyong Sun, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 16/970,431

(22) PCT Filed: Apr. 10, 2019

(86) PCT No.: PCT/CN2019/082084
§ 371 (c)(1),
(2) Date: Aug. 17, 2020

(87) PCT Pub. No.: WO2020/124881
PCT Pub. Date: Jun. 25, 2020

(65) Prior Publication Data
US 2020/0382740 A1 Dec. 3, 2020

(30) Foreign Application Priority Data
Dec. 20, 2018 (CN) .......................... 201811564738.5

(51) Int. Cl.
*H04N 5/63* (2006.01)
*G09G 3/34* (2006.01)
*H04N 5/57* (2006.01)

(52) U.S. Cl.
CPC .............. *H04N 5/63* (2013.01); *G09G 3/3406* (2013.01); *H04N 5/57* (2013.01); *G09G 2320/0626* (2013.01); *G09G 2330/021* (2013.01)

(58) Field of Classification Search
CPC .......... H04N 5/63; H04N 5/57; G09G 3/3406; G09G 2320/0626; G09G 2330/021; G09G 2330/02
(Continued)

(56) References Cited

U.S. PATENT DOCUMENTS

2007/0194210 A1* 8/2007 Lee .......................... H03F 3/08
250/214 R
2008/0100546 A1* 5/2008 Lee ...................... G09G 3/3406
345/83
(Continued)

FOREIGN PATENT DOCUMENTS

CN 201063915 Y 5/2008
CN 201773565 U 3/2011
(Continued)

OTHER PUBLICATIONS

International Search Report dated Sep. 19, 2019 in corresponding International application No. PCT/CN2019/082084; 4 pages.
First Office Action dated Jan. 20, 2020 in corresponding International application No. 201811564738.5; 16 pages.

*Primary Examiner* — Michael Lee
(74) *Attorney, Agent, or Firm* — Maier & Maier, PLLC (57) ABSTRACT

A mini LED television control system and method to reduce loss includes a power supply used for supplying power to a backlight board after a voltage is adjusted; a control board connected to the power supply, the control board including an FPGA used for detecting a current value and controlling a power supply output voltage, an analog-to-digital conversion chip used for collecting the voltages of sampling
(Continued)

circuits, and a plurality of sampling circuits connected to a plurality of light boards and used for collecting voltages of the light boards; constant current ICs disposed on the light boards and used for providing light bar voltages and sending brightness information; and a mainboard connected to the control board and used for enabling and synchronizing backlight brightness signals. The control board converts brightness information sent by the mainboard and then sends the information to the constant current ICs on corresponding light boards.

16 Claims, 7 Drawing Sheets

(58) Field of Classification Search
USPC .......................................................... 348/730
See application file for complete search history.

(56) References Cited

U.S. PATENT DOCUMENTS

| 2012/0217898 | A1* | 8/2012 | Pansier | H05B 45/46 |
| | | | | 315/297 |
| 2013/0049637 | A1 | 2/2013 | Chen et al. | |
| 2014/0055046 | A1* | 2/2014 | Shteynberg | H05B 45/38 |
| | | | | 315/186 |
| 2017/0059628 | A1* | 3/2017 | Xu | G01R 21/08 |
| 2017/0303360 | A1* | 10/2017 | Hu | H05B 45/14 |
| 2017/0310923 | A1* | 10/2017 | Yang | H04N 5/63 |

FOREIGN PATENT DOCUMENTS

| CN | 202178047 U | 3/2012 |
| CN | 104253957 A | 12/2014 |
| CN | 105407582 A | 3/2016 |
| CN | 107464533 A | 12/2017 |
| CN | 108200687 A | 6/2018 |

* cited by examiner

MINI LED TELEVISION CONTROL SYSTEM AND METHOD

CROSS-REFERENCES TO RELATED APPLICATIONS

This application is a national stage application of PCT Patent Application No. PCT/CN2019/082084, filed on Apr. 10, 2019, which claims priority to Chinese Patent Application No. 201811564738.5 filed on Dec. 20, 2018, the content of all of which is incorporated herein by reference.

FIELD

The present disclosure relates to the technical field of smart TV applications, and more particularly, to a mini LED TV control system and method thereof.

BACKGROUND

With continuous advancement achieved in a display technology, an ordinary LED TV can no longer meet a higher picture quality requirement, while a Local Dimming technology (a TV backlight area adjustment technology) together with an HDR technology (HDR: High-Dynamic Range) can make the picture quality of a television greatly improved. At present, limited by a lamp bead size and a partition number thereof, the Local Dimming technology cannot obtain a qualitative leap in improving the picture quality. While an emergence of a mini LED technology directly makes it enter an era of matching an effect of an OLED. The mini LED may be simply understood as a miniature sized LED, and by using thousands of mini LEDs as a backlight source, together with the Local Dimming technology, it is possible to achieve an independent control to each LED; if a size of the LED is small enough and a number thereof is large enough, up to one LED applied as a backlight for a pixel, so as to achieve an infinite contrast, making the picture quality a qualitative leap.

Figure 1:
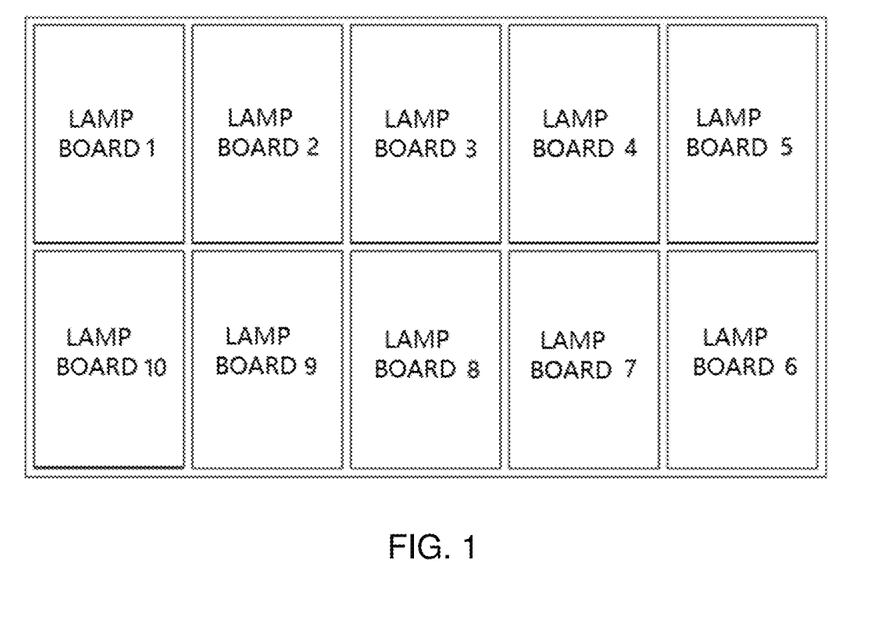
FIG. 1 illustrates a schematic diagram on an effect after installing a light board onto a mini LED backboard.

A backlight of a mini LED TV is composed of thousands of LEDs. In order to facilitate both production and design, it is generally divided into several partitions evenly, shown as FIG. 1, an effect is shown by dividing into 10 pieces of lamp boards. For a plurality of factors including facilitating wiring, reducing interferences and more, a constant current driver IC is placed directly on the lamp board, thus, each lamp board can adopt a same design and use a same PCB, which is convenient for production.

Figure 2:
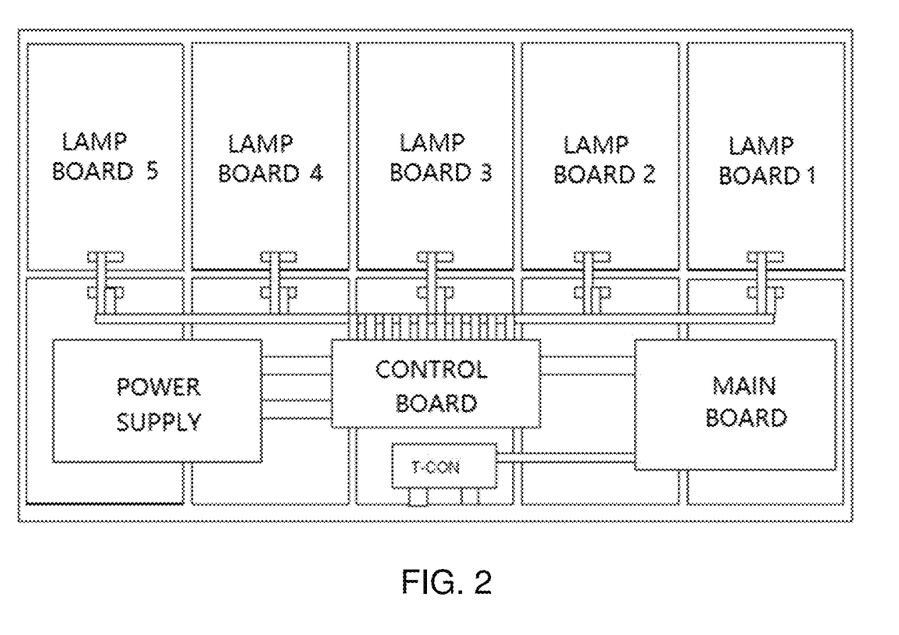
FIG. 2 illustrates a schematic diagram on a general distribution of each module of an internal system in a mini LED TV.
Figure 3:
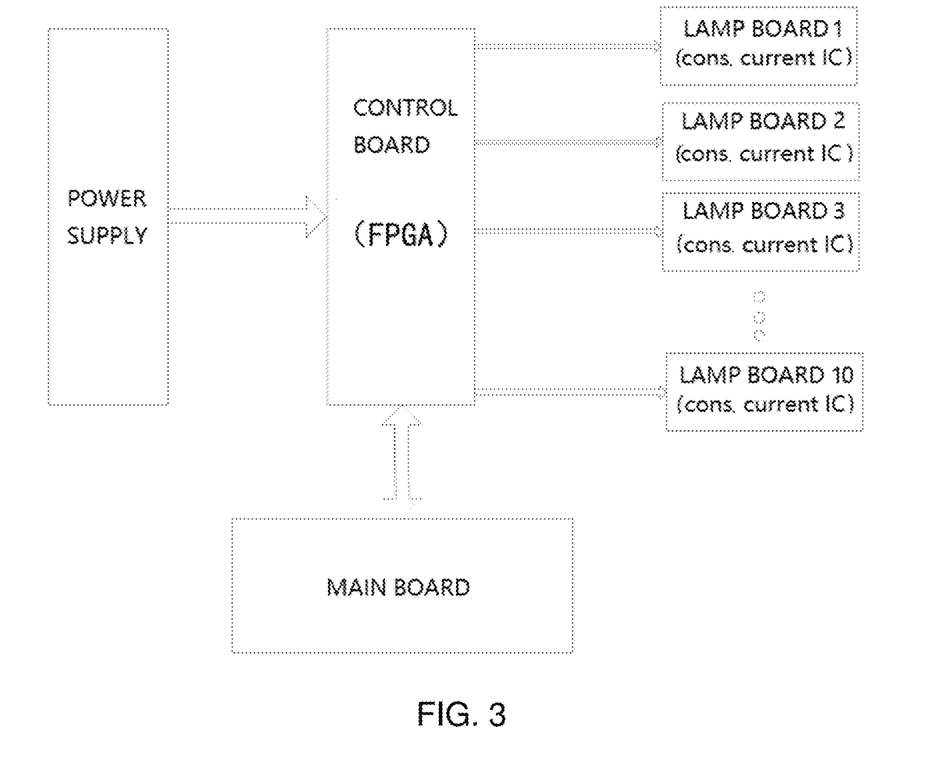
FIG. 3 illustrates a schematic diagram on a connection relationship between each module in the mini LED TV.

FIG. 2 illustrates a general distribution diagram of each module inside an internal system of the mini LED TV, which mainly comprises: a power supply, a main board, a control board, a T-CON and a lamp board with an constant current IC (Integrated Circuit); wherein, a main function of the control board is delivering a brightness information sent out from the main board to the constant current IC on a lamp board accordingly after making a conversion, and the constant current IC controls a current value of the LEDs in the partition correspondingly, before achieving a corresponding brightness. (Note: Each partition may be designed as composed by a single LED, a string of LEDs or a plurality of sets of LED strings connected in serial or parallel). The power supply mainly supplies power to the main board, the control board and the lamp board. Generally, the power supply outputs a fixed voltage to the control board, before distributing the voltage to each lamp board through the control board. Thus, all of the LEDs in all partitions are positive in common, that is, they are all powered by one voltage, shown as FIG. 3.

Figure 4:
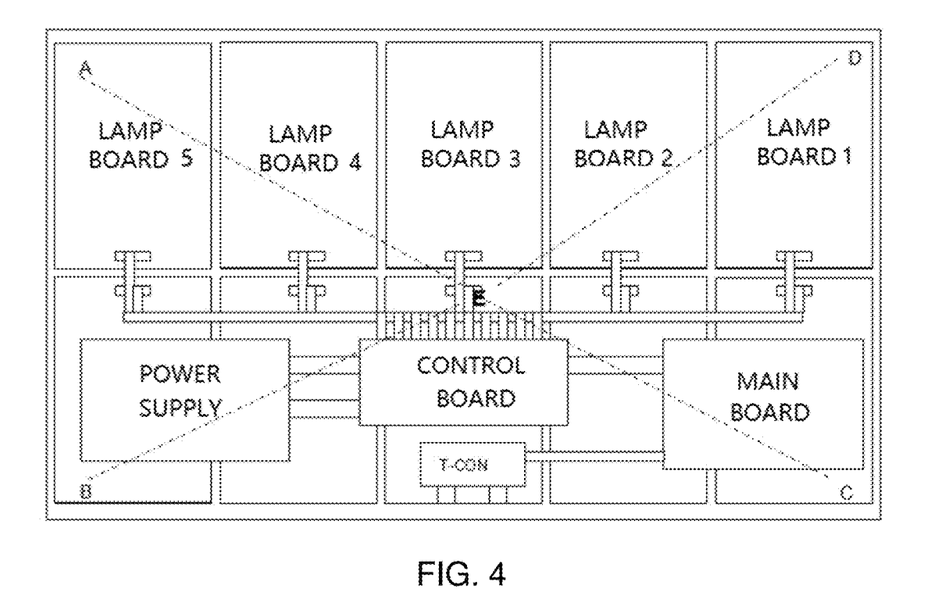
FIG. 4 illustrates a schematic diagram on a voltage difference between the mini LEDs due to a line loss in different divisions.

Each partition is powered by a same voltage, while due to a presence of line loss (for tens of thousands of LEDs, it is unrealistic for each partition to be connected to the power supply independently, and it is only possible to distribute the power output to the lamp boards by the control board, before being distributed to each partition by each lamp board), the control board is required to provide a current of 2A or even larger to each of the lamp boards. As shown in FIG. 4, a partition voltage at a plurality of points of ABCD far away from the power supply is inevitably lower than that nearby a point E relatively closer. In order to make sure that all the LEDs in each partition can be turned on normally, an output voltage has to be increased, so as to fully light up the LEDs at the points of ABCD having a relatively lower voltage between both terminals due to the line loss. At this moment, the voltage is relatively high for the partitions nearby including that of the point E and more, while an excess voltage has to be wasted on driving a circuit and on the wiring, that will generate a big amount of heat, resulting in an energy efficiency low.

In addition to a reason of the line loss, a voltage of the LED produced in different batches of a manufacturer may also have difference exist. In order to ensure that all batches of the LED lamps are fully lit up, for a system with a power source having a fixed voltage output, the voltage has to be increased to meet a plurality of high-voltage LEDs, thus for a plurality of low-voltage LEDs, an output voltage is also pretty high, and an excess voltage is also required to be consumed in the circuit. Thus, for the system with a power supply having a fixed voltage output, a ratio of the energy efficiency will be very poor, which leads to a waste of the power supply. In addition to affecting a reliability of a product, a cost of the power supply is increased, while a design difficulty of the power supply is also increased (since a power of the power supply increases).

That is, a difference is existing in the voltage of different batches of LED lamps, and the line loss will inevitably lead to a difference in different partition voltages. Due to the differences caused by these factors, a traditional fixed voltage system can only output a higher voltage to meet all cases. The voltage is relatively high for the LED lamps in some batches and the LED lamps in some partitions, while the excess voltage can only be consumed by the circuit, Therefore, the present technology needs to be improved and developed

SUMMARY

A technical problem to be solved by the present disclosure is that, in view of the defects of the prior art, the present disclosure provides a mini LED TV control system and a method thereof, aiming at making the power supply output a most appropriate voltage, and reducing an overall loss of the mini LED TV, through a closed-loop control system having a voltage from a power supply adjustable before being output, combining with an intelligent control by an FPGA (Field Programmable Gate Array) algorithm. The present disclosure reduces a complexity of a system and lowers a cost thereof, without being required to detect the current on each partition; instead, it is simplified to detecting a total current input into a quarter area of a lamp board, so as to determine whether a lamp current of the LED lamps in the area has reached a set value or not. When all of several channels to be detected have reached the set value, the output voltage at this moment from the power supply is fixed, so that the power supply outputs an appropriate voltage to improve an energy efficiency of the entire system. Compared to a fixed voltage output, the energy efficiency will be improved greatly.

The technical solutions of the present disclosure are as follows:

A mini LED TV control system, wherein the mini LED TV control system comprises:

a power supply, applied to powering a backlight panel after adjusting a voltage;

a control board connecting to the power supply, the control board comprises an

FPGA, applied to detecting a current value and controlling an output voltage from the power supply, an analog-to-digital conversion chip, applied to collecting and sampling a circuit voltage, and a plurality of sampling circuits connecting to a plurality of lamp boards respectively, applied to collecting a voltage of the lamp board;

a constant current IC, arranged on the lamp board and applied to providing a voltage to a light bar and sending a brightness information;

a main board, connected to the control board and applied to enabling and synchronizing a backlight brightness signal;

the control board is applied to converting before sending the brightness information sent by the main board to the constant current IC on the lamp board correspondingly, and the constant current IC controls a current value of an LED lamp in a partition correspondingly.

The mini LED TV control system, wherein the analog-to-digital conversion chip connects to the FPGA, and the analog-to-digital conversion chip connects to the plurality of sampling circuits respectively.

The mini LED TV control system, wherein four channels are set from the control board to each lamp board for powering the LEDs, and each channel supplies power to a quarter of the LEDs in the lamp board.

The mini LED TV control system, wherein the power supply connects to the lamp board through the four channels, and samples the current of the lamp board by connecting a sampling resistor or a Hall current sensor between the power supply and the lamp board.

A mini LED TV control method based on the mini LED TV control system, wherein the mini LED TV control method comprises:

a number of the channels that the control board connects to each lamp board to supply power to the LED lamps is set as four, and each channel supplies power to a quarter of the LED lamps in the lamp board, while two of the channels are selected for a current detection;

sampling the current of the lamp board by connecting a sampling resistor or a Hall current sensor between the power supply and the lamp board, and converting a current signal into a voltage signal for processing;

the FPGA compares the voltage obtained with a set value, if the voltage has reached the set value, a total current has been reached, and all of the LED lamps have reached a set current, a high level is output, otherwise a low level is output, and the FPGA controls the power supply to fix the voltage output at a present value;

or collecting a voltage obtained by the sampling circuit through the analog-to-digital conversion chip, and the FPGA obtains a specific current value at a present value through calculation and conversion; when all of a plurality of detection channels have reached an expected current, the FPGA controls the power supply to fix the voltage output at a present value.

The mini LED TV control method, wherein the FPGA compares the voltage obtained with a set value, if the voltage has reached the set value, a total current has been reached, and all of the LED lamps have reached a set current, a high level is output, otherwise a low level is output, and the FPGA controls the power supply to fix the voltage output at the present value, comprising specifically:

the FPGA compares the voltage obtained with the set value, after the detection circuit converting the current signal into the voltage signal;

if the voltage has reached the set value, a total current has been reached by default, and all of the LED lamps have reached a set current, a high level is output, otherwise a low level is output;

the FPGA judges whether the channel has reached a set current value or not, if all the detection channels have reached, and the FPGA detects a high level, the FPGA fixes a duty cycle output of PWM, making the power supply fix the voltage output at the present value.

The mini LED TV control method, wherein collecting a voltage obtained by the sampling circuit through the analog-to-digital conversion chip, and the FPGA obtains a specific current at a present value through calculation and conversion; when all of the detection channels have reached the expected current, the FPGA controls the power supply to fix the voltage output at the present value, comprises specifically:

adopting the analog-to-digital conversion chip to collect the voltage obtained by the sampling circuit, after converting the current signal into the voltage signal through the detection circuit;

the FPGA obtains a specific current at present value of the channel in real time through calculation and conversion, when all of the detection channels have reached the expected current, the FPGA fixes the duty cycle output of PWM, making the power supply fix the voltage output at the present value.

The mini LED TV control method, wherein judging whether the voltage from the power supply is appropriate or not by judging whether the current has reached the set value or not.

The mini LED TV control method, wherein a judgment on whether the output voltage is appropriate or not is based on whether making the current of all the LED lamps reach the set value.

The mini LED TV control method, wherein a method of the current sampling comprises a resistance sampling and a Hall current sensor sampling.

The mini LED TV control method, wherein the resistance sampling and the Hall current sensor sampling are both converting the current signal into a voltage signal, before providing to an MCU (Microcontroller Unit) for process.

The mini LED TV control method, wherein the MCU outputs a voltage through a digital-to-analog conversion to adjust a feedback for the power supply in order to adjust the output voltage from the power supply.

The mini LED TV control method, wherein a judgment on whether the output voltage is appropriate or not is based on whether making the current of all the LED lamps reach the set value.

The mini LED TV control method, wherein detecting a total input current in a quarter partition of a lamp board, and deciding whether the current of the LED lamps in the partition has reached the set value or not.

The mini LED TV control method, wherein the control board converts the brightness information sent by the main board before sending to the constant current IC on the lamp board correspondingly, and the constant current IC controls the current value of the LED lamps in the partitions correspondingly.

The present disclosure provides a MINI LED TV control system and a method thereof, the system comprises: a power supply, applied to powering a backlight panel after adjusting a voltage; a control board, connected to the power supply, the control board comprises an FPGA, applied to detecting a current value and controlling an output voltage from the power supply, an analog-to-digital conversion chip, applied to collecting and sampling a circuit voltage, and a plurality of sampling circuits connecting to a plurality of lamp boards respectively, applied to collecting a voltage of the lamp board; a constant current IC, arranged on the lamp board and applied to providing a voltage of a light bar and sending a brightness information; a main board, connected to the control board and applied to enabling and synchronizing a backlight brightness signal; the control board is applied to converting before sending the brightness information sent by the main board to the constant current IC on the lamp board correspondingly, and the constant current IC controls a current value of an LED lamp in a partition correspondingly. By the closed-loop control system having the output voltage from the power supply adjustable before being output, combining with the intelligent control by the FPGA algorithm, the present disclosure makes the power supply output the most appropriate voltage, reduces an overall loss of the Mini LED TV.

DETAILED DESCRIPTION OF EMBODIMENTS

In order to make the purposes, technical solutions, and effects of the present disclosure clearer and more specific, the present disclosure will be described in further details below. It should be understood that the specific embodiments described herein are only used to explain the present disclosure and are not intended to limit the present disclosure.

Embodiment 1

Figure 5:
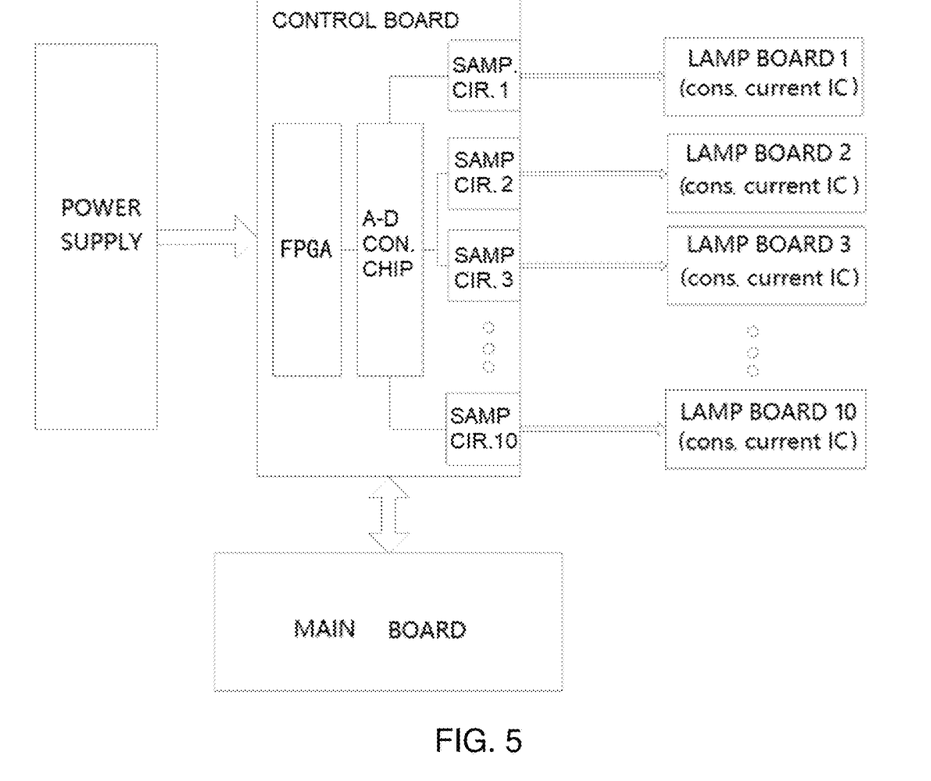
FIG. 5 illustrates a functional schematic diagram of an embodiment of the control system in the mini LED TV of the present disclosure.

The present disclosure provides a mini LED TV control system, wherein an architecture thereof is shown in FIG. 5, the mini LED TV control system comprises: a power supply, applied to powering a backlight panel after adjusting a voltage; a control board, connected to the power supply, the control board comprises an FPGA, applied to detecting a current value and controlling an output voltage from the power supply, an analog-to-digital conversion chip (A-D CON. CHIP), applied to collecting and sampling a circuit voltage, and a plurality of sampling circuits (SAMP. CIR.) connecting to a plurality of lamp boards respectively, applied to collecting a voltage of the lamp board; a constant current IC (cons. current IC), arranged on the lamp board and applied to providing a voltage of a light bar and sending a brightness information; a main board, connected to the control board and applied to enabling and synchronizing a backlight brightness signal; the control board is applied to converting before sending the brightness information sent by the main board to the constant current IC on the lamp board correspondingly, and the constant current IC controls a current value of an LED lamp in a partition correspondingly.

Wherein, the analog-to-digital conversion chip connects to the FPGA, and the analog-to-digital conversion chip connects to a plurality of sampling circuits respectively; a number of a plurality of channels from the control board to each lamp board for powering the LEDs is set as four, and each channel supplies power to a quarter of the LEDs in the lamp board; the power supply connects to the lamp board through the four channels, and sampling the current of the lamp board by connecting a sampling resistor or a Hall current sensor between the power supply and the lamp board.

The present disclosure, through a closed-loop control system having a voltage from a power supply adjustable before being output, combining with an intelligent control by an FPGA algorithm, makes the power supply output a most appropriate voltage, reduces an overall loss of the mini LED TV. By adopting the closed-loop control system designed in the present disclosure, the power supply outputs the most appropriate voltage, reducing an unnecessary energy waste, reducing a power loss of the mini LED TV significantly, thus improving energy efficiency greatly.

Specifically, a key to improving the energy efficiency of the mini LED is solving a major problem: how to make the power supply output an appropriate voltage to supply power to a light bar, which means that an entire system has to be made into a closed-loop system, and the voltage from the power supply can be adjusted according to any needs. A main difficulty in designing the system is how to judge an output voltage from the power supply is reasonable, making the overall loss minimum, generally, when at a 100% full light, the output voltage from the power supply can just make all lamps fully light up, and such a voltage is considered relatively appropriate. A basis for judgment of being able to fully light up is that the currents of all LED lamps have reached a set value.

Figure 6:
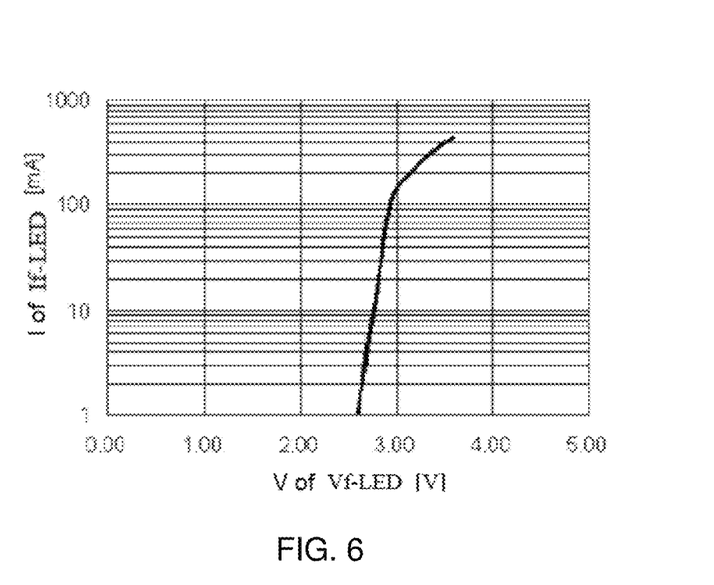
FIG. 6 illustrates a schematic diagram on a corresponding relationship between a current If and a voltage Vf of the LED in the present disclosure.

As shown in FIG. 6, different currents If of the LED lamps are corresponding to different voltages Vf, the greater the current If is, the higher the voltage Vf required is. And when the voltage provided by the power supply cannot reach the Vf required by the LED, the current of the LED cannot reach a set value If. Therefore, it is possible to judge whether the voltage from the power supply is appropriate by judging whether the current has reached the set value.

Because there are tens of thousands of LEDs in the mini LED, if detecting the current of each lamp, the system designed will be huge and complicated, with a high cost. Based on considerations above, a certain total current of several lamp boards is selected as the basis for judgment.

Embodiment 2

Based on the mini LED TV control system, the present disclosure further provides a mini LED TV control method, wherein, the mini LED TV control method comprises:

a number of the channels that the control board connects to each lamp board to supply power to the LED lamps is set as four channels, and each channel supplies power to a quarter of the LED lamps in the lamp board, while two of the channels are selected for a current detection;

sampling the current of the lamp board by connecting a sampling resistor or a Hall current sensor between the power supply and the lamp board, and converting a current signal into a voltage signal for processing;

the FPGA compares the voltage obtained with a set value, if the voltage has reached the set value, a total current has been reached, and all of the LED lamps have reached a set current, a high level is output, otherwise a low level is output, and the FPGA controls the power supply to fix the voltage output at a present value;

or collecting a voltage obtained by the sampling circuit through the analog-to-digital conversion chip, and the FPGA obtains a specific current at the present value through calculation and conversion; when all of a plurality of detection channels have reached an expected current, the FPGA controls the power supply to fix the voltage output at the present value.

The FPGA compares the voltage obtained with a set value, if the voltage has reached the set value, a total current has been reached, and all of the LED lamps have reached a set current, a high level is output, otherwise a low level is output, and the FPGA controls the power supply to fix the voltage output at the present value; wherein the FPGA controls the power supply to fix the voltage output at the present value, comprising specifically: the FPGA compares the voltage obtained with the set value, after the detection circuit converting the current signal into the voltage signal; if the voltage has reached the set value, it is considered in default that a total current has been reached, and all of the LED lamps have reached a set current, a high level is output, otherwise a low level is output; the FPGA judges whether the channel has reached a set current value. If all the detection channels have been reached, and the FPGA detects a high level, the FPGA fixes the duty cycle output of PWM, making the power supply fix the voltage output at the present value.

Collecting the voltage obtained by the sampling circuit through the analog-to-digital conversion chip, and the FPGA obtains the specific current at the present value through calculation and conversion; when all of the detection channels have reached the expected current, the FPGA controls the power supply to fix the voltage output at the present value, comprising specifically: adopting the analog-to-digital conversion chip to collect the voltage obtained by the sampling circuit, after converting the current signal into the voltage signal through the detection circuit; the FPGA obtains a specific current value of the channel at present in real time through calculation and conversion, when all of the detection channels have reached the expected current, the FPGA fixes the duty cycle output of PWM, making the power supply fix the voltage output at the present value.

Figure 7:
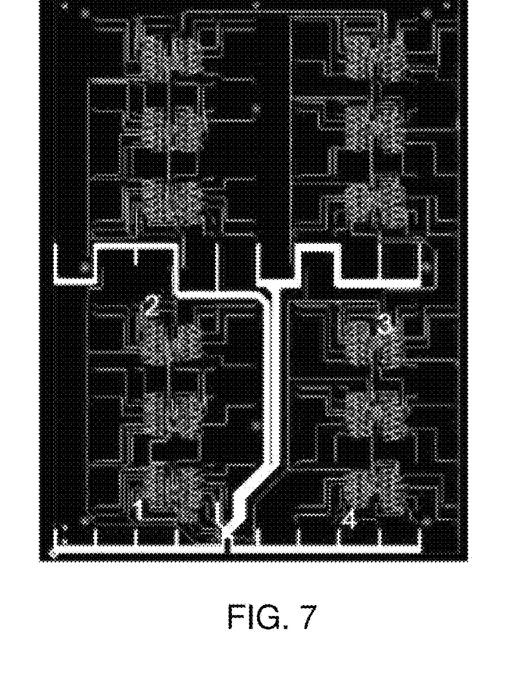
FIG. 7 illustrates a schematic diagram on a wiring of a driving circuit on the lamp board of the present disclosure.
Figure 8:
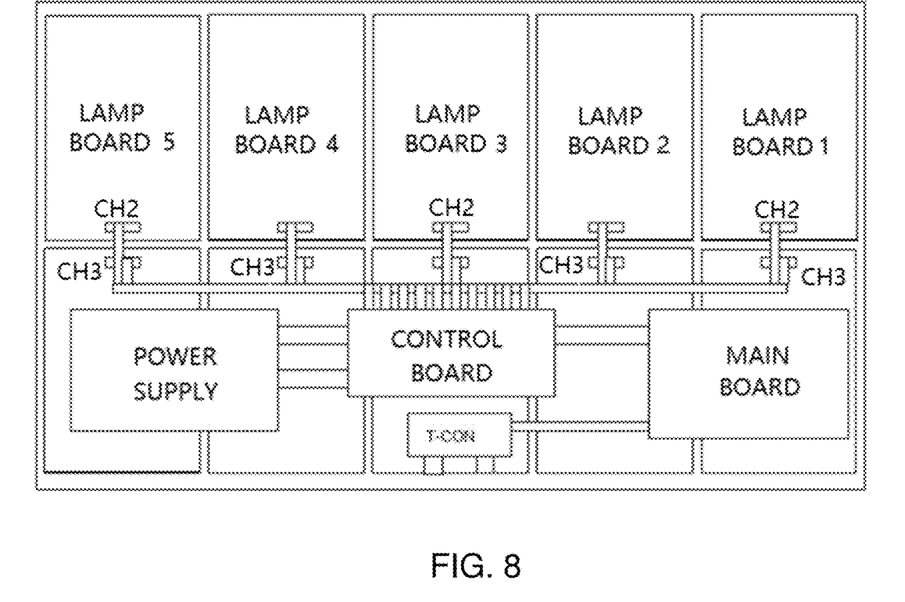
FIG. 8 illustrates a schematic diagram of selecting a plurality of detection points for detection in the present disclosure.

Specifically, in order to reduce a line loss, a number of the channels where the control board connects to each lamp board to supply power to the LED lamps changes from one originally to four at present, and each channel supplies power to a quarter of the LED lamps in the lamp board; that may basically ensure the LEDs in a same batch having a voltage pretty close, while hard to guarantee that in different batches. In order to reduce a cost and reduce a complexity of the system, targeted selections of different channels on different lamp boards for the detection, are adopted for detecting, applied to reflecting a condition of all partitions. A lit-up part in FIG. 7 is each wire supplying power on the lamp board. It can be seen that, two lines of a line 2 and a line 3 on each lamp board have a longer wire, the LED lamps power supplied by the two lines have a relatively low voltage theoretically, thus the two lines may be selected for a detection. Since lamps on the lamp board are symmetrically and equally distributed, thus as shown in FIG. 8, wherein several channels (CH1, CH2, CH3) for output may be selected for the detection (a number of the channels selected is based on a real effect).

Figure 9:
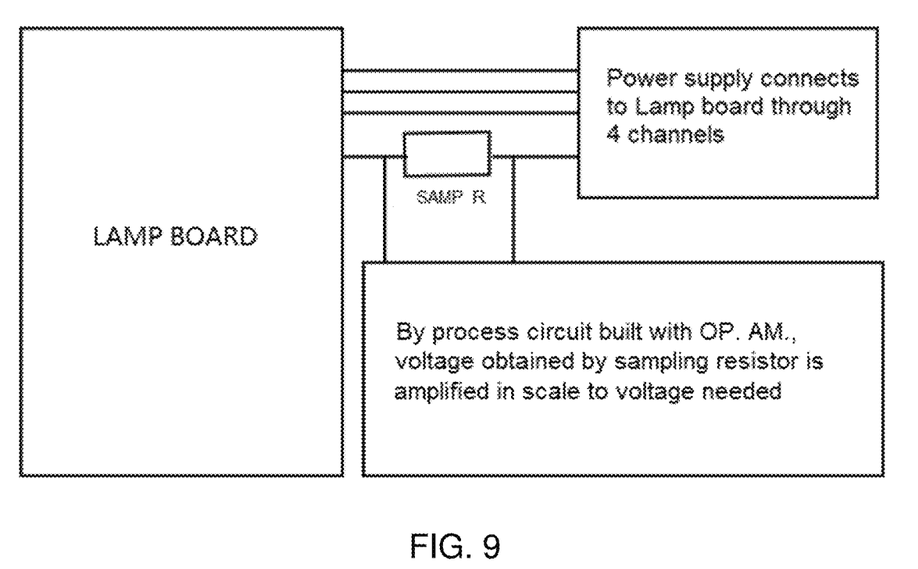
FIG. 9 illustrates a schematic diagram on a principle of sampling by a resistance for the current sampling in the present disclosure.
Figure 10:
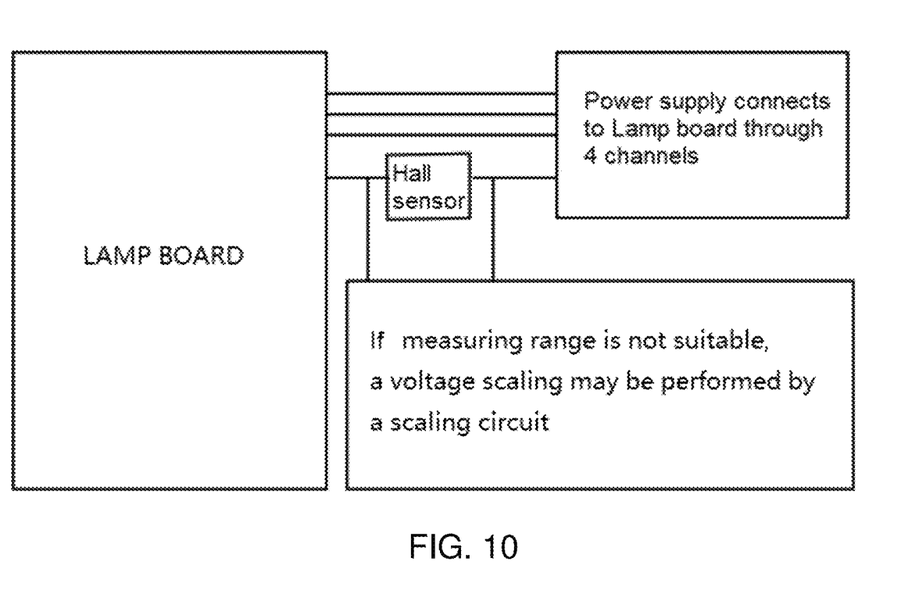
FIG. 10 illustrates a schematic diagram on a principle of sampling by a Hall current sensor for the current sampling in the present disclosure.

Sampling a current has mainly two methods: a resistance sampling and a Hall current sensor sampling. FIG. 9 shows the resistance sampling. The resistance sampling has a low cost, but requires an additional conversion circuit to be designed. Generally, a processing circuit built by an operational amplifier (OP. AM.), amplifies a voltage obtained by the sampling resistance (SAMP. R), to a required voltage in a scale. An accuracy is easily affected by a temperature. Shown as FIG. 10, if a measuring range is not appropriate, it is possible to perform a voltage scaling through a scaling circuit. The Hall current sensor has a higher accuracy and a simpler and more reliable circuit design, but a higher cost. Both methods are converting a current signal into a voltage signal at last before providing to an MCU for processing. The present disclosure selects a solution correspondingly according to a positioning of a specific product.

Figure 11:
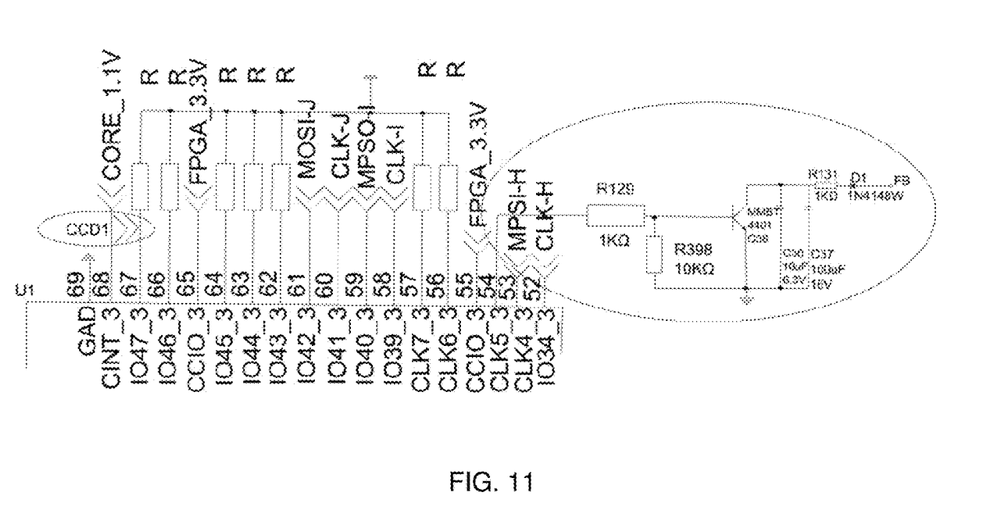
FIG. 11 illustrates a schematic diagram on a detection circuit for converting a current signal into a voltage signal in the present disclosure.

Generally, the MCU outputs a voltage (0-2.5V) through a digital-to-analog conversion (DAC) to adjust a feedback FB of the power supply in order to adjust the output voltage from the power supply. The FPGA currently used has no built-in DAC function. It is possible to output a PWM signal passing the detection circuit shown in FIG. 11 to achieve adjusting the FB of the power supply (FB is a feedback of the power supply, it is possible to achieve adjusting the power supply output by adjusting the voltage at this point).

After converting the current signal into the voltage signal through the detection circuit, there are two methods to pass to the FPGA to process.

Figure 12:
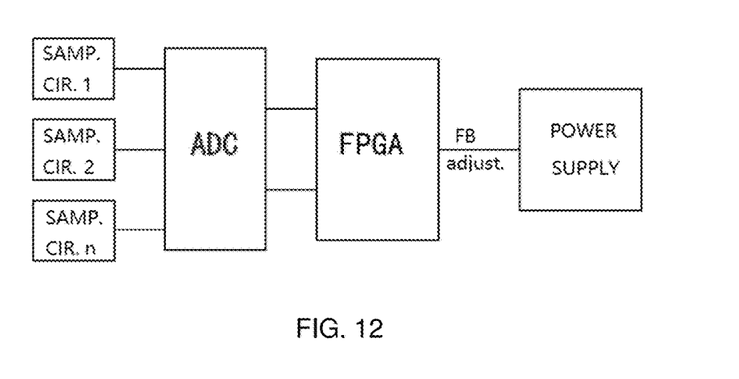
FIG. 12 illustrates a schematic diagram on a principle of determining whether the voltage has reached the set value by comparing with a set value in the present disclosure.

Method 1: As shown in FIG. 12, comparing the voltage obtained with a set value, if the voltage has reached the set value, then the total current of the circuit is considered in default having been reached, all the lamps have reached the set current, and a high level is output. Otherwise, a low level is output. It is the FPGA to determine whether this channel has reached the set current or not, once all detection channels have reached the set current, the FPGA will detect and obtain a high level, and the FPGA will fix the duty cycle output of PWM, so that the power supply will fix the voltage output at this moment.

Figure 13:
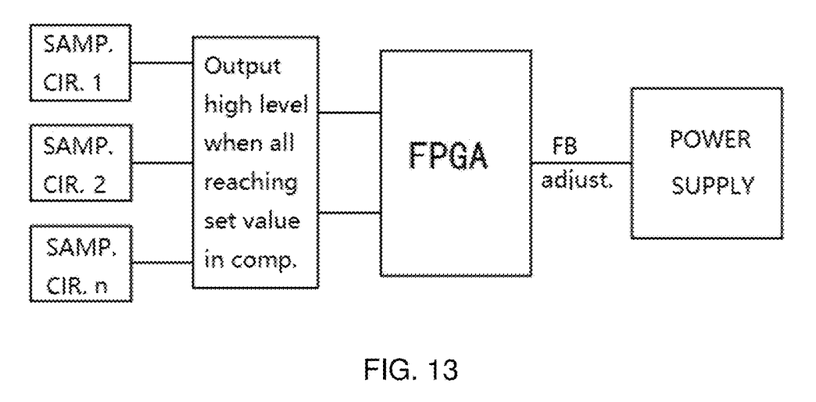
FIG. 13 illustrates a schematic diagram on a principle of adopting an ADC to obtain a current value in a real time in the present disclosure.

Method 2: As shown in FIG. 13, collecting a voltage obtained by the sampling circuit through the analog-to-digital conversion (ADC) chip, and the FPGA is able to obtain a specific current at a present value in a real time through calculation and conversion; when all detection channels have reached the expected current, the FPGA will fix the duty cycle output of PWM, so that the power supply will fix the voltage output at this moment.

Wherein, method 2, performing a data process by the ADC, has a relatively flexible design, many misoperations may be avoided through a software design. And under a certain abnormal conditions, method 1 cannot make an effective identification, while method 2 is relatively compatible, and it is possible to realize changing different current value by software changes. At a same time, because it is possible to know the current in real time, according to a product positioning difference and a requirement difference, both methods are adopted in the present disclosure.

Figure 14:
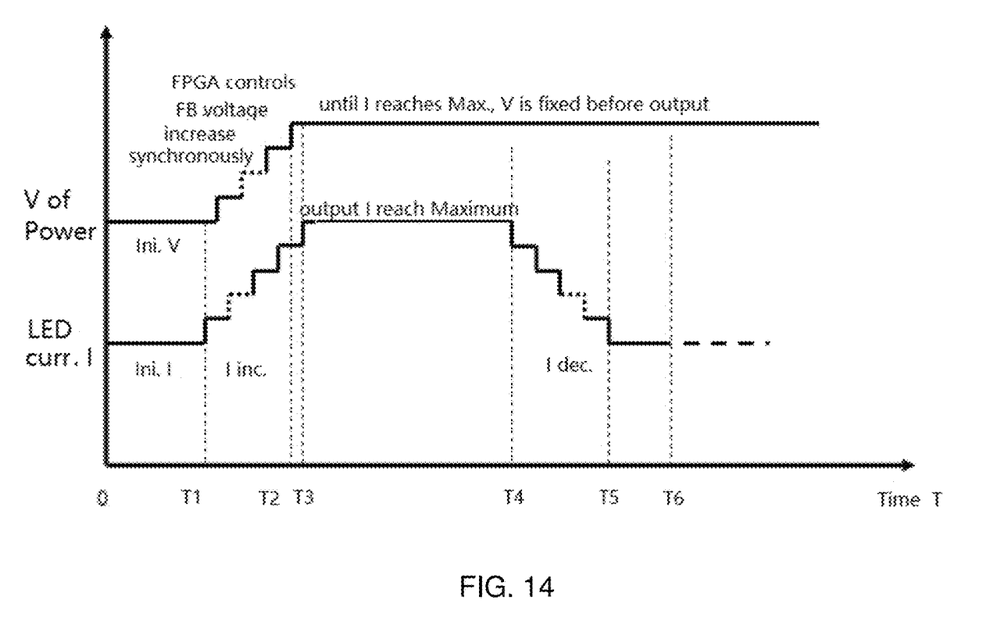
FIG. 14 illustrates a schematic diagram on determining an output voltage at a time sequence of starting control in the present disclosure.

From all above, a judgment basis for judging whether the output voltage is appropriate or not, is whether making currents of all LED lamps reach the set value. When normally playing pictures, the currents in different partitions of the picture are different. There is no way to judge whether the current has reached the set value or not, thus it is impossible to judge whether the output voltage from the power supply is appropriate or not. Therefore, it is more appropriate to determine the output voltage when powering on. FIG. 14 is a control timing sequence diagram, shown as FIG. 14:

during a time period of 0-T1: starting from the mainboard giving out an enable signal, the FPGA completes a self-initialization and a constant current initialization. At this time, the backlight is not controlled by the mainboard, and the FPGA gives a default appropriate current (set according to an actual effect), the voltage of the power supply is also a default value at this time;

during a time period of T1-T2: in order not to make a brightness change abruptly, the current increases sequentially in several cycles during T1-T2, before performing a smoothing process; when the set current of the LED is not reached, the FPGA will control the voltage to rise (if the voltage is not increased at this time, the current of the LED lamps cannot reach a set value, due to an insufficient voltage), at this time, when it is detected that one channel has reached the set value, the voltage will not rise any more, to avoid the voltage from rising too fast (because it is needed to find a voltage at which all LED lamps reach a maximum current, thus it is not demanded that the voltage is exceeded at this moment);

at a moment of T2: although the set current has reached a maximum, not all the collection channels have reached the set value (although a maximum current has been set, the voltage at present is not large enough to make all the channels reach the set value), continuing to increase the output voltage is needed;

during a time period of T2-T3: setting a maximum value for the current, the FPGA continues to increase the voltage, so that at a moment of T3, all the collection channels have reached the set value. By default, the output voltage from the power supply is the most appropriate. The output voltage is fixed during a time period (T3-T4) to be the appropriate voltage looking for;

during a time period of T4-T5: the current decreases sequentially to an initial value (T5-T6), in and after this time period, the voltage keeps to be a fixed value output before;

after T6, the FPGA starts to be controlled by the main board, delivering the brightness information sent from the main board to the constant current IC, and controlling the brightness of the partition correspondingly, while the voltage keeps unchanged to be the voltage found before.

All stated above is a whole control process of deciding the output voltage from the power supply. In order to reduce a complexity of the system and reduce a cost thereof, it is not necessary to detect the current on each partition; instead, it is simplified to detecting a total current input into a quarter area of a lamp board, so as to determine whether the current of the LED lamps in the area has reached the set value or not. When all of several channels to be detected have reached the set value, the output voltage at this moment from the power supply is fixed, so that the power supply outputs an appropriate voltage to improve an energy efficiency in a whole. Compared to a fixed voltage output, the energy efficiency will be improved greatly.

The present disclosure adopts an intelligent control closed-loop system frame design that combining the FPGA as a core and a plurality of peripheral circuit designs together, to improve the energy efficiency of the mini LED TVs and the Micro LED TVs; by combining both software and hardware, it is achieved that the power supply outputs a most appropriate voltage to supply the LED lamps through an intelligent control.

All above, the present disclosure provides a MINI LED TV control system and a method thereof, the system comprises: a power supply, applied to powering a backlight panel after adjusting a voltage; a control board, connected to the power supply, the control board comprises an FPGA, applied to detecting a current value and controlling an output voltage from the power supply, an analog-to-digital conversion chip, applied to collecting and sampling a circuit voltage, and a plurality of sampling circuits connecting to a plurality of lamp boards respectively, applied to collecting a voltage of the lamp board; a constant current IC, arranged on the lamp board and applied to providing a voltage of a light bar and sending a brightness information; a main board, connected to the control board and applied to enabling and synchronizing a backlight brightness signal; the control board is applied to converting before sending the brightness information sent by the main board to the constant current IC on the lamp board correspondingly, and the constant current IC controls a current value of an LED lamp in a partition correspondingly. By the closed-loop control system having the output voltage from the power supply adjustable before being output, combining with the intelligent control by the FPGA algorithm, the present disclosure makes the power supply output the most appropriate voltage, reduces an overall loss of the Mini LED TV.

It should be understood that the application of the present disclosure is not limited to the above examples. For those skilled in the art, improvements or changes can be made according to the above description, and all such improvements and changes should fall within the protection scope of the appended claims of the present disclosure.

INDUSTRIAL APPLICABILITY

The present disclosure provides a mini LED TV control system and a method thereof, delivering a brightness information sent out from a main board to a constant current IC on a corresponding lamp board after making a conversion, and the constant current IC controls a current value of a LED lamp in a corresponding the partition; through a closed-loop control system having a voltage from a power supply adjustable before being output, the power supply outputs a most appropriate voltage, and reduces an overall loss of the mini LED TV.

What is claimed is:

1. A mini LED TV control system, comprising:
   a power supply applied to powering a backlight panel after adjusting a voltage;
   a control board connecting to the power supply, the control board comprising an FPGA applied to detecting a current value and controlling an output voltage from the power supply, an analog-to-digital conversion chip applied to collecting and sampling a circuit voltage, and a plurality of sampling circuits connecting to a plurality of lamp boards respectively applied to collecting a voltage of the lamp board;
   a constant current IC arranged on the lamp board and applied to provide a voltage to a light bar and send a brightness information;
   a main board connected to the control board and applied to enabling and synchronizing a backlight brightness signal; and
   the control board is applied to converting, before sending, the brightness information sent by the main board to the constant current IC on the lamp board correspondingly, and the constant current IC controls a current value of an LED lamp in a partition correspondingly;
   wherein the FPGA compares the voltage obtained by the sampling circuit with a set value, if the voltage has reached the set value, a total current has been reached, and all of the LED lamps have reached a set current, a high level is output, otherwise a low level is output, and the FPGA controls the power supply to fix the voltage output at a present value.

2. The mini LED TV control system according to claim 1, wherein the analog-to-digital conversion chip connects to the FPGA, and the analog-to-digital conversion chip connects to the plurality of sampling circuits respectively.

3. The mini LED TV control system according to claim 1, wherein four channels are set from the control board to each lamp board for powering the LEDs, and each channel supplies power to a quarter of the LEDs in the lamp board.

4. The mini LED TV control system according to claim 3, wherein the power supply connects to the lamp board through the four channels, and samples the current of the lamp board by connecting a sampling resistor or a Hall current sensor between the power supply and the lamp board.

5. A mini LED TV control method based on the mini LED TV control system according to claim 1, comprising:
   setting a number of channels that the control board connects to each lamp board to supply power to the LED lamps as four, and each channel supplies power to a quarter of the LED lamps in the lamp board, while two of the channels are selected for a current detection;
   sampling the current of the lamp board by connecting a sampling resistor or a Hall current sensor between the power supply and the lamp board, and converting a current signal into a voltage signal for processing; and
   comparing, with the FPGA, the voltage obtained with a set value, if the voltage has reached the set value, a total current has been reached, and all of the LED lamps have reached a set current, a high level is output, otherwise a low level is output, and the FPGA controls the power supply to fix the voltage output at a present value;
   or collecting a voltage obtained by the sampling circuit through the analog-to-digital conversion chip, and the FPGA obtains a specific current at a present value through calculation and conversion; when all of a plurality of detection channels have reached an expected current, the FPGA controls the power supply to fix the voltage output at a present value.

6. The mini LED TV control method according to claim 5, wherein the comparing, with the FPGA, of the voltage obtained with a set value, if the voltage has reached the set value, a total current has been reached, and all of the LED lamps have reached a set current, a high level is output, otherwise a low level is output, and the FPGA controls the power supply to fix the voltage output at the present value, comprising:
   converting the current signal into the voltage signal by the detection circuit, and then the FPGA compares the voltage obtained with the set value;
   if the voltage has reached the set value, a total current has been reached by default, and all of the LED lamps have reached a set current, a high level is output, otherwise a low level is output; and
   the FPGA judges whether the channel has reached a set current value or not if all the detection channels have reached, and the FPGA detects a high level, the FPGA fixes a duty cycle output of PWM, making the power supply fix the voltage output at the present value.

7. The mini LED TV control method according to claim 5, wherein the collecting of a voltage obtained by the sampling circuit through the analog-to-digital conversion chip, and the FPGA obtains a specific current at a present value through calculation and conversion; when all of the detection channels have reached the expected current, the FPGA controls the power supply to fix the voltage output at the present value, comprises:
   adopting the analog-to-digital conversion chip to collect the voltage obtained by the sampling circuit, after converting the current signal into the voltage signal through the detection circuit; and
   the FPGA obtains a specific current value of the channel at present in real time through calculation and conversion, when all of the detection channels have reached the expected current, the FPGA fixes the duty cycle output of PWM, making the power supply fix the voltage output at the present value.

8. The mini LED TV control method according to claim 5, further judging whether the voltage from the power supply is appropriate or not is performed by judging whether the current has reached the set value or not.

9. The mini LED TV control method according to claim 8, further judging whether an output voltage is appropriate or not is based on whether making the current of all the LED lamps reach the set value.

10. The mini LED TV control method according to claim 5, wherein the current sampling comprises a resistance sampling and a Hall current sensor sampling.

11. The mini LED TV control method according to claim 10, wherein the resistance sampling and the Hall current sensor sampling are both converting the current signal into a voltage signal, before providing to an MCU for process.

12. The mini LED TV control method according to claim 11, wherein the MCU outputs a voltage through a digitalto-analog conversion to adjust a feedback for the power supply in order to adjust the output voltage from the power supply.

13. The mini LED TV control method according to claim 12, further judging whether the output voltage is appropriate or not is based on whether making the current of all the LED lamps reach the set value.

14. The mini LED TV control method according to claim 5, further detecting a total input current in a quarter partition of a lamp board, and deciding whether the current of the LED lamps in the partition has reached the set value or not.

15. The mini LED TV control method according to claim 5, wherein the control board converts and delivers the brightness information sent by the main board to the constant current IC on a corresponding lamp board, and the constant current IC controls a current value of the LED lamp in a corresponding partition.

16. The mini LED TV control method according to claim 7, further judging whether the output voltage is appropriate or not is based on whether making the current of all the LED lamps reach the set value.

* * * * *